(12) United States Patent
Manthei

(10) Patent No.: US 12,135,582 B1
(45) Date of Patent: Nov. 5, 2024

(54) ARTICULATING SUN SHIELD FOR ELECTRONIC COMPONENTS

(71) Applicant: David Manthei, Minneapolis, MN (US)

(72) Inventor: David Manthei, Minneapolis, MN (US)

(*) Notice: Subject to any disclaimer, the term of this patent is extended or adjusted under 35 U.S.C. 154(b) by 164 days.

(21) Appl. No.: 18/053,984

(22) Filed: Nov. 9, 2022

Related U.S. Application Data

(60) Provisional application No. 63/277,454, filed on Nov. 9, 2021.

(51) Int. Cl.
*G06F 1/16* (2006.01)
*A45B 23/00* (2006.01)
*F16M 13/02* (2006.01)

(52) U.S. Cl.
CPC ............ *G06F 1/1603* (2013.01); *A45B 23/00* (2013.01); *F16M 13/022* (2013.01); *A45B 2023/0006* (2013.01); *A45B 2023/0012* (2013.01); *A45B 2023/0031* (2013.01); *A45B 2023/0068* (2013.01); *A45B 2023/0075* (2013.01); *A45B 2023/0081* (2013.01); *A45B 2023/0093* (2013.01)

(58) Field of Classification Search
CPC ............ A45B 23/00; A45B 2023/0006; A45B 2023/0012; A45B 2023/0031; A45B 2023/0068; A45B 2023/0075; A45B 2023/0081; A45B 2023/0093; A45B 2017/005; A45B 17/00; Y10S 248/918; Y10S 248/921; G06F 1/1603
USPC ............... 248/178.1, 181.1, 481, 276.1, 663; 160/351; 135/15.1, 20.1, 20.3, 87, 98
See application file for complete search history.

(56) References Cited

U.S. PATENT DOCUMENTS

| | | | | |
|---|---|---|---|---|
| 382,125 | A * | 5/1888 | White | G03B 15/02 396/4 |
| 558,296 | A * | 4/1896 | McDonald | A01K 97/10 135/90 |
| 840,241 | A * | 1/1907 | Nootbaar | F16C 11/106 248/515 |
| 1,382,783 | A * | 6/1921 | Howard | F16M 11/04 403/56 |
| 1,460,697 | A * | 7/1923 | Bendlin | A47B 27/06 403/56 |
| 2,598,588 | A * | 5/1952 | Hopkins | A45B 23/00 52/165 |
| 3,428,286 | A * | 2/1969 | Del Pesco | F16M 13/02 248/278.1 |
| 3,568,963 | A * | 3/1971 | Koskinen | A45B 17/00 403/68 |
| 3,765,434 | A * | 10/1973 | Riggs | F16M 13/022 135/20.1 |
| 3,910,538 | A * | 10/1975 | Baitella | F16M 11/14 403/56 |
| 4,082,102 | A * | 4/1978 | Heuer | E04H 15/003 135/120.2 |

(Continued)

*Primary Examiner* — Robert Canfield
(74) *Attorney, Agent, or Firm* — UNDERWOOD & ASSOCIATES, LLC

(57) ABSTRACT

A sun shield includes a base, a shield, an articulating arm assembly including first and second arm members, each of the arm members including proximal and distal end portions, the proximal end portions of each of the arm members being hingedly joined. The base is attached to the distal end portion of the first arm member, and the shield is attached to the distal end portion of the second arm member.

14 Claims, 5 Drawing Sheets

(56) References Cited

U.S. PATENT DOCUMENTS

| | | | | |
|---|---|---|---|---|
| 4,100,633 | A * | 7/1978 | Pintos | A45B 23/00 |
| | | | | 5/639 |
| 4,293,162 | A * | 10/1981 | Pap | A47C 7/66 |
| | | | | D6/333 |
| 4,431,329 | A * | 2/1984 | Baitelle | F16M 11/14 |
| | | | | 403/55 |
| 4,491,435 | A * | 1/1985 | Meier | F16M 11/2078 |
| | | | | 403/56 |
| 4,531,855 | A * | 7/1985 | Wallis | F16M 11/2078 |
| | | | | 403/90 |
| 5,033,528 | A * | 7/1991 | Volcani | F16M 11/40 |
| | | | | 403/56 |
| D332,497 | S * | 1/1993 | Shufelt | D24/232 |
| 5,339,847 | A * | 8/1994 | Kanter | A45B 23/00 |
| | | | | 248/533 |
| 5,641,191 | A * | 6/1997 | Jia | F16M 11/2078 |
| | | | | 403/90 |
| 5,673,628 | A * | 10/1997 | Boos | B60N 3/001 |
| | | | | 108/138 |
| 5,884,888 | A * | 3/1999 | Grimes, III | F21V 33/0048 |
| | | | | 248/441.1 |
| 6,405,742 | B1 * | 6/2002 | Driscoll | A45B 17/00 |
| | | | | 135/42 |
| 7,497,225 | B1 * | 3/2009 | Klein, Jr. | A45B 3/00 |
| | | | | 135/118 |
| 9,232,836 | B1 * | 1/2016 | Zaccaro | A45B 23/00 |
| 9,321,336 | B2 * | 4/2016 | Sasaki | B60J 11/08 |
| 9,557,002 | B2 * | 1/2017 | Wong | F16M 11/2064 |
| 9,675,146 | B1 * | 6/2017 | Howell | A45B 23/00 |
| 10,765,185 | B1 * | 9/2020 | Wengerd | F16B 2/185 |
| 11,160,339 | B2 * | 11/2021 | McKenzie | A45B 23/00 |
| 2001/0020484 | A1 * | 9/2001 | Ormanoski | A45B 11/00 |
| | | | | 135/120.2 |
| 2005/0056309 | A1 * | 3/2005 | Bree | A45B 23/00 |
| | | | | 135/147 |
| 2009/0139669 | A1 * | 6/2009 | Robin | A45B 11/00 |
| | | | | 24/457 |
| 2009/0272866 | A1 * | 11/2009 | Solomovitz Brief | F16M 11/14 |
| | | | | 248/276.1 |
| 2013/0068915 | A1 * | 3/2013 | Yang | F16M 11/041 |
| | | | | 248/551 |
| 2013/0291915 | A1 * | 11/2013 | Pirshafiey | A47C 7/72 |
| | | | | 135/96 |
| 2015/0237750 | A1 * | 8/2015 | Yang | F16M 11/041 |
| | | | | 206/45.2 |
| 2016/0208509 | A1 * | 7/2016 | Ngu | E04H 12/2284 |
| 2017/0086314 | A1 * | 3/2017 | Simon | F16M 11/041 |
| 2017/0202321 | A1 * | 7/2017 | Maurello | A45B 23/00 |
| 2018/0192751 | A1 * | 7/2018 | Frankel | A45B 23/00 |
| 2021/0076790 | A1 * | 3/2021 | LeAnna | A45B 25/08 |
| 2024/0011317 | A1 * | 1/2024 | Green | F03D 9/11 |

* cited by examiner

ARTICULATING SUN SHIELD FOR ELECTRONIC COMPONENTS

CROSS REFERENCE TO RELATED APPLICATIONS

This application claims priority to and the benefit under 35 USC § 119 (e) of U.S. Provisional Patent Application No. 63/277,454 filed on Nov. 9, 2021, the contents of which are incorporated by reference in their entirety as if fully set forth herein.

TECHNICAL FIELD

This disclosure relates to systems and methods providing an articulatable sun screen or shade. In particular, this disclosure relates to a sun shield that provides shade to a selected location by way of an articulating arm and a sun-blocking member. The sun screen or shade is configured particularly for use by DJ's in the rave, concert and live performance industries.

BACKGROUND

Outdoor concerts and musical performances are a popular pastime throughout the world. In the early 1980s, with the advent of personal computers, performers began producing electronic music by playing and mixing sounds (including tracks) through various electronic components. Today, electronic music has elevated to the mainstream and is featured in musical performances, events, and festivals all over the world, much like traditional musical performances have done for many decades. In addition to the music, which is produced primarily via electronics, performers leverage many different types of visual entertainment to accompany the musical performance, including dancers, lasers, lights, and other features.

These electronic music exhibitions feature one or more performers who produce the music. In some cases, the performers generate music 'on the fly', in real time, using digitally-stored tracks and sounds on various computing platforms and equipment. Thus, like traditional music performances, each performance at an electronic music exhibition by a particular performer can be slightly different and thus unique to the event or venue.

Such performers are colloquially called 'DJ's', a holdover from the term "disc jockey" which was given to radio hosts as they played records (discs). However, today's DJ's have a vast array of electronic equipment—CDJs, computers, mixers, samplers, track recorders, drum machines, etc.—available at their disposal. Many DJ's use equipment with digital screens (such as laptop screens and mixer displays) for various tasks, such as selecting tracks, referencing sound libraries and many other features.

Electronic music performances are popular outdoor events that often occur in the warm months of summer or in tropical locations, often times where it is sunny. As is known, sunshine can impede the ability of a user to see a computer or device display screen. To combat this effect, computer companies have offered anti-glare coatings; screen brightness controls; and other features intended to prevent a user from straining to see screen content in bright sunlight. However, especially outside, such attempts can still fall short of optimal on bright, sunny days or when bright light is shining at a particularly disadvantageous angle for the performer. Equally, a DJ can be exposed to bright performance lights, especially during an event where such lights can be integral to an overall experience.

Indeed, part of a DJ's performance often includes dancing and individual physical performance. DJ's often delight in displaying to the audience that they are in full control of the music they are providing to potentially hundreds or thousands of attendees. Therefore, a DJ typically does not want to appear to be straining to read a digital screen controlling or affecting their performance; nor would a DJ wish to miss a musical cue displayed on their screen; and nor would a DJ wish to be forced to remain near a CDJ or computer screen for lack of visual acuity caused by the sun or other lights. Additionally, DJs typically wish for the audience to see that the music being produced is directly correlated with actions they are taking on the equipment, so line of sight between audience and the DJs' hands and control of equipment is often paramount.

Lastly, a DJ's electronic setup is often admired by their fans, much like that of a drummer's drum set or a guitarist's chosen instrument. In many cases, a DJ's setup is sleek and modern looking. Therefore, while something like a traditional umbrella could be used, as it often is for providing shade from the sun, such an approach would be aesthetically and artistically contrary to the persona of many DJ's. Furthermore, an umbrella or similar tool would shade the DJ from performance light being cast upon them, which could be detrimental to the intended visual effect. Additionally, a traditional umbrella lacks the ability to articulate in such a way as to adjust to changing light conditions in a quick and graceful manner.

To the best knowledge of the Applicant, a manually-articulatable sun shade or screen configured to block the sun from reaching a CDJ, computer screen or electronic components of a DJ's set up, which also provides the ability to quickly and effortlessly move the shade or screen into a desired location, and which also provides a way in which to collapse the shade or screen into a compact, visually unobtrusive configuration is an unmet need in the art.

SUMMARY

In general, an articulating sun shield is disclosed. The sun shield can be used, in a preferred embodiment, by DJ's and other performers to block lights that interfere with the ability to clearly see CDJ and computer screens and other electronic equipment displays due to reflection, glare and other effects of bright lights. The sun shield is sleek and modern looking in form, which can supplement or enhance the overall display of a DJ or performer. Similarly, the shield portion of the sun shield is thin and non-transmissive to light, allowing the performer to adjust the shield so that the audience's view of the performer is not obfuscated.

In one exemplary embodiment, a sun shield includes a base, a shield, an articulating arm assembly including first and second arm members, each of the arm members including proximal and distal end portions, the proximal end portions of each of the arm members being hingedly joined. The base is attached to the distal end portion of the first arm member, and the shield is attached to the distal end portion of the second arm member. In this embodiment, the base and the shield are interchangeable; in other words, the sun shield can be interchangeably flipped upside down so that it is supported by the shield. Such functionality provides the ability to quickly move the sun shield from left- to right-hand sides, for example.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

Figure 1:
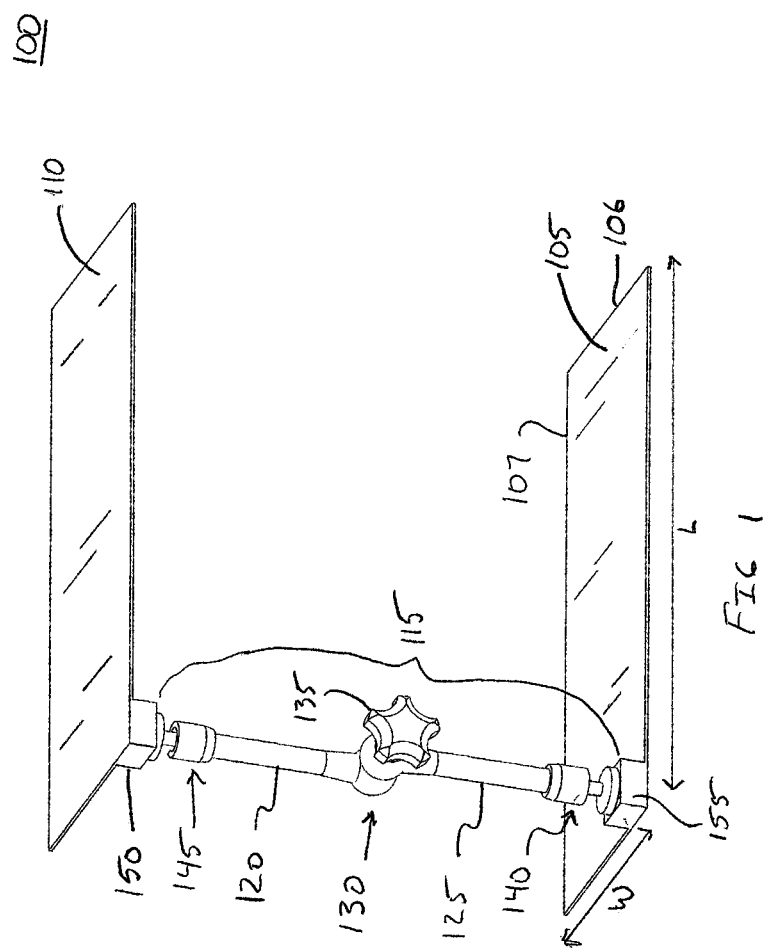
FIG. 1 is a perspective view of a sun shield according to one embodiment.

FIG. 1 is a sun shield 100, according to one embodiment. In this embodiment, the sun shield 100 includes a base 105, an articulating arm assembly 115, and a shield 110. In this embodiment, the shield is thin and opaque or non-transmissive of light. One exemplary shield material is aluminum, although other non-transmissive materials can be used in the alternative. In this embodiment, the base 105 is specifically configured to be thin, as particularly illustrated in FIG. 4, to allow the base 105 to fit at least partially underneath an electronic component of a disc-jockey setup, such as a CDJ (a specialized digital music player for DJing), laptop computer, mixing table, drum machine or other component.

As is known in the art, electronic components of the type previously mentioned, and others, often include feet for the purpose of providing a space beneath the component. The feet may aid in providing air circulation to the component to prevent overheating or for other reasons. Some CDJs and laptop computers, for example, have feet or nubs that provide a gap of about one-quarter inch; some mixing tables and drum machines, for example, have feet or nubs that provide a gap beneath the component of about one-half inch. Thus, in this embodiment, the base 105 preferably has a height of less than about one-half inch, e.g., ⅛".

Similarly, in this embodiment, the base 105 is thin enough to be slid underneath a CDJ component, laptop computer, mixing table, drum machine, synthesizer or other electronic component of a DJ's set up, and be placed within the footprint of any feet or nubs that provide vertical clearance of the electronic component relative to a table or other surface on which it may rest. Without wishing to be bound by the multitude of different configurations of feet, nubs and other objects that provide vertical clearance of various electronic components, available on the market, a preferable length L (FIG. 1) is between eight and sixteen inches, and a preferable width W is between five and nine inches. In general, it can be advantageous to select length and width dimensions of the base such that the feet or nubs of electronic components-such as a CDJ-rest on the base for optimal security and stability. For example, the feet of a CDJ component may be configured as a rectangle having a one foot by one foot area. Thus, in a preferred embodiment, the length and width of the base can be, for example, one foot, one inch, respectively.

In this embodiment, the articulating arm assembly 115 includes an upper arm 120, a lower arm 125, a variable-friction pivot joint 130 that provides pivoting of the upper arm 120 relative to the lower arm 125, and a knob 135 configured to lock the upper (120) and lower (125) arms into a desired orientation relative to one another. The lower arm 125 can be joined to the base 105 by, for example, welding the components together, providing a threaded aperture in the lower arm which receives a bolt that extends through the base and into the threaded aperture, or other alternatives. The distal end of the upper arm 120 includes a ball joint 145; likewise, the distal end of the lower arm 125 includes a ball joint 140 as illustrated.

Figure 2:
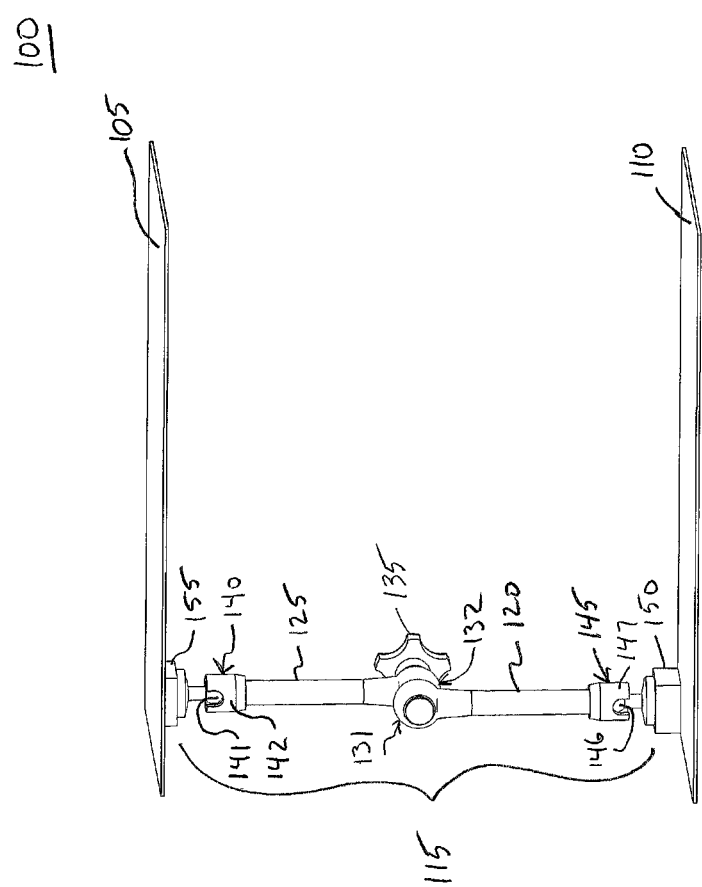
FIG. 2 is a perspective side view of the sun shield of FIG. 1.

Referring briefly to FIG. 2, in this embodiment, the upper ball joint 145 includes a ball stem 146 that itself attaches to a foot member 150. A cup member 147 is configured to retain the ball portion of the ball stem 146 within the cup member 147 and allow rotation of the ball stem 146 with respect to the cup member 147. The cup member 147 is configured with an opening aperture that is smaller than the diameter of the ball, which prevents the ball from disengaging from the cup under normal use. Similarly, the lower ball joint 140 includes a ball stem 141 rotationally engaged with cup member 142, wherein the ball stem 141 is attached to a foot member 155.

In this embodiment, the variable-friction pivot joint 130 is configured to allow the positions of each of the arms 120, 125, and ball joints 140, 145 to be locked into a desired orientation by rotation of the knob 135. In this embodiment, rotation of knob 135 in a locking direction pulls the proximal end 132 of the upper arm 120 and the proximal end 131 of the lower arm 125 into a frictional engagement and simultaneously pulls each of the ball stem members 141, 146 into their respective cup members 142, 145, also into frictional engagement. The arms 120, 125 and ball joints 140, 145 can be released from a locked orientation by rotating the knob 135 in an opposite direction as that necessary to lock. In this way, the articulating arm assembly 115 can be manipulated into a desired orientation with one hand and locked into the desired orientation with the other hand by rotation of knob 135.

Figure 3:
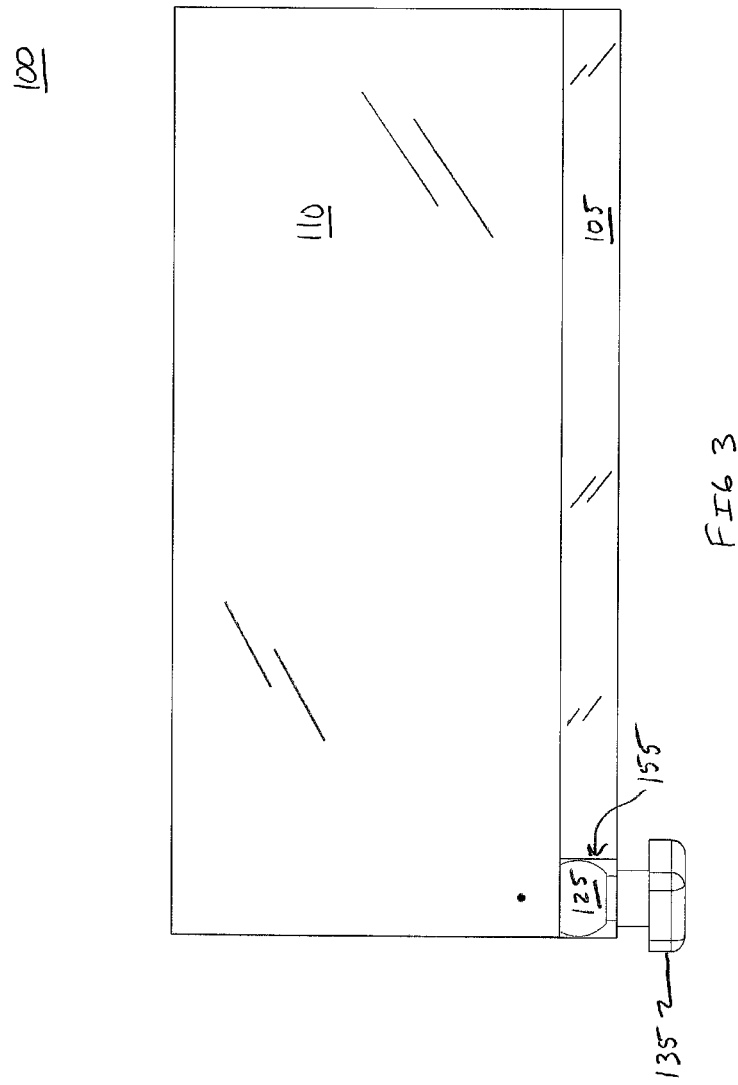
FIG. 3 is a top plan view of the sun shield of FIG. 1.
Figure 4:
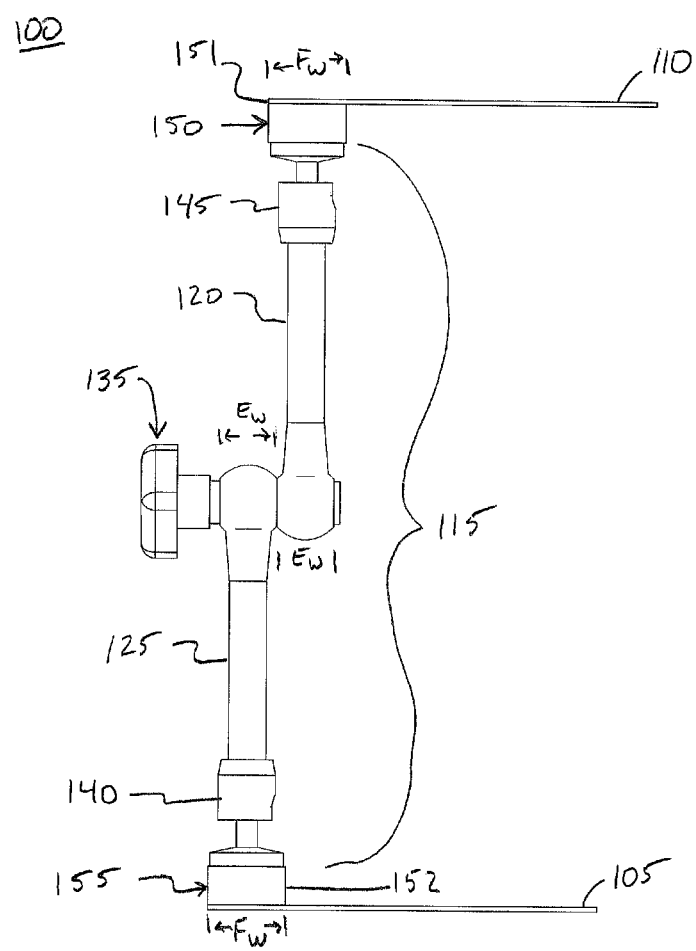
FIG. 4 is a side elevation view of the sun shade of FIG. 1.

In this embodiment, each of the feet 150, 155 are placed at a corner location of each of the base 105 and shield 110. One advantage of the sun shield 100 is that it can be manipulated between an extended configuration, e.g., as illustrated in FIG. 1, and a compact configuration, e.g., as illustrated in FIG. 5E, described below. Referring to FIG. 4, in this embodiment, the foot width $F_W$ is selected to be approximately equal to, or less than width $E_W$ of the proximal end portions of the upper (120) and lower (125) arms as illustrated. This configuration allows the sun shield 100 to be brought into a compact configuration of minimal space and allows for the purely in-plane rotation of each of the upper (120) and lower (125) arms when manipulating the sun shield 100 into a compact configuration. In a compact configuration as shown in FIG. 5E, edge 151 of shield 110 confronts, or lies immediately adjacent to side 152 of foot 155 as shown. FIG. 3 illustrates a top plan view of the sun shade 100 in an extended configuration, showing the offset of the shield 110 relative to base 105, accounting for the width of foot 155 and lower arm 125.

Figure 5A:
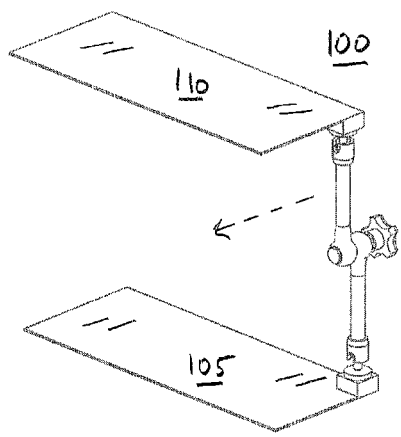
FIGS. 5A-5E show an illustrative sequence of manipulation of a sun shield according to one embodiment.
Figure 5B:
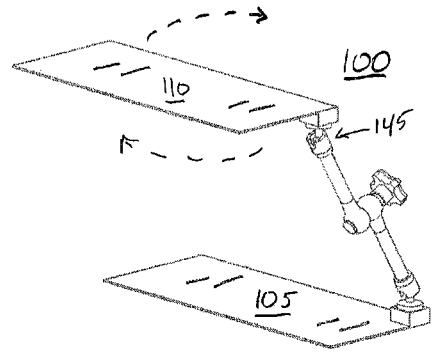
Figure 5C:
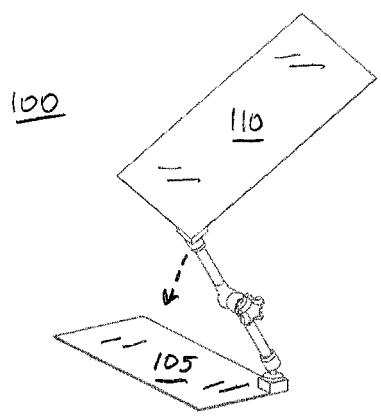
Figure 5D:
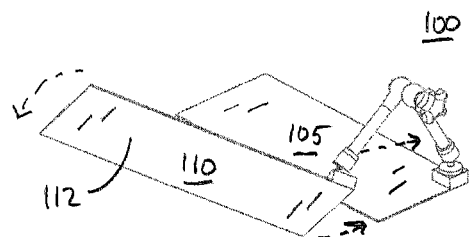
Figure 5E:
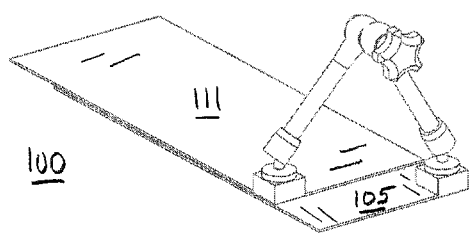

Turning now to FIGS. 5A-5E, a use of the sun shield 100 is illustrated according to one embodiment. The sequence of figures illustrates the sun shield 100 being manipulated to the compact configuration. In this example, referring first to FIG. 5A, the sun shield 100 is shown in an extended configuration. To begin manipulating the shield 100, knob 135 is first rotated so as to allow movement of the upper (120) and lower (125) arms, and the ball joints 140, 145. Next, the articulating arm assembly 115 is tilted in the direction of the dashed arrow, thereby translating shield 110 laterally with respect to base 105. Next, at FIG. 5B, shield 110 is pivoted approximately ninety degrees about ball joint 145 as illustrated by the dashed arrows. Next, at FIG. 5C, the articulating arm assembly 115 is twisted about ninety degrees so that knob 135 faces outwardly, as shown. Next, upper arm 120 is rotated downward, until an angle of about ninety degrees is formed between the upper arm 120 and the lower arm 125, as illustrated in FIG. 5D. Next, shield 110 is pivoted about ball joint 145 again, such that the top surface 112 of the shield is flipped upside down, exposing bottom side 111 of the shield 110. Lastly, as illustrated in FIG. 5E, the shield 110 is maneuvered into place such that the top surface 112 of the shield 110 confronts base 105, and the shield 110 is in parallel arrangement with the base 105 as illustrated.

It should be understood that the foregoing example of use is but one of virtually limitless configurations, arrangements, etc. and should not be construed to be limiting with respect to the claims.

The illustrations of FIGS. 5A-5E exemplify only a few possible arrangements of the shield 110. Because the articulating arm assembly 115 provides almost limitless degrees of freedom, the shield can be placed in almost an unlimited number of configurations to block the sun or other bright lights.

In one exemplary use, a sun shield 100 of the type described herein can be used by DJ's to provide shade over electronic equipment, and in particular, to block computer screens from the sun or bright lights. As is known in the arts, computer screens can be difficult to read in low-light conditions or when a bright light source creates reflections or glare. Because DJ's often use computers and CDJs for queueing music, samples and other tasks, bright lights can interfere with their ability to perform.

One advantage of many, of the sun shield 100 is that often times the sun is directly overhead; likewise, from a DJ's perspective, stage lights are often directly, or nearly overhead. If a DJ were to use a stand-up shade, for example, the view of his performance would be blocked from the audience. However, the thin nature of the shield 100 provides necessary shading of electronic components such as CDJs and computer screens, while, from the audience's perspective, only a thin portion of the view of the DJ is blocked. Thus, a DJ's performance, which may be a large part of a show, is unencumbered by the use of the shield. Furthermore, when in a compact configuration, the sun shield 100 can be immediately available to the DJ without consuming space on what are sometimes small tables.

In this and other embodiments, the sun shield 100 can include adornments, reflective surfaces, accoutrements and other features to enhance its visual presence. For example, the perimeter of the shield 110 can be outfitted with colored lights; in another example, the top surface of the shield 112 can be reflective, such as a mirror, to enhance features of a laser light show.

A number of illustrative embodiments have been described. Nevertheless, it will be understood that various modifications may be made without departing from the spirit and scope of the various embodiments presented herein. For example, while certain dimensions of the sun shield 100 have been provided as exemplary embodiments, other shapes, sizes and dimensions can be utilized in alternative embodiments; articulating arm assembly 115 can include additional arms, joints, locking and unlocking mechanisms. Accordingly, other embodiments are within the scope of the following claims.

What is claimed is:

1. A light shield, comprising:
   a base;
   a shield;
   an articulating arm assembly comprising first and second arm members, each of said arm members comprising proximal and distal end portions, said proximal end portions of each of said arm members being hingedly joined;
   wherein said base is attached to said distal end portion of said first arm member, and said shield is attached to said distal end portion of said second arm member;
   wherein said distal end portion of said first arm and said distal end portion of said second arm are each attached to said base and said shield by first and second ball joint assemblies, respectively; and
   wherein when said shield is oriented above and parallel to said base:
      said first ball joint assembly is positioned on a top surface and left-corner of said base; and
      said second ball joint assembly is positioned on a bottom surface, left-corner of said shield.

2. The light shield of claim 1, wherein said base has a thickness of less than one-half of one inch.

3. The light shield of claim 2, wherein said thickness of said base is one-eighth of one inch.

4. The light shield of claim 3, wherein said shield has a thickness of one-eighth of one inch or less.

5. The light shield of claim 4, wherein each of said base or said shield are formed of aluminum, titanium or plastic.

6. The light shield of claim 1, wherein said proximal end portions of each of said arm members are rotatable in three dimensions.

7. The light shield of claim 6, wherein said proximal end portions of each of said arm members are joined by a variable-friction pivot joint.

8. The light shield of claim 1, wherein said base is rectangular and said shield is rectangular.

9. The light shield of claim 1, wherein said first and second ball joint assemblies provide the capability for each of said base and said shield to rotate 360 degrees in a plane.

10. The light shield of claim 1, wherein said proximal end portions of each of said arm members are joined by a variable-friction pivot joint; and
    wherein said light shield further comprises a locking knob configured to lock each of said proximal end portions of each of said arm members, said first and second ball joints, and said base and shield in a desired orientation.

11. The light shield of claim 10, wherein said base and said shield are manipulatable between an extended configuration and a compact configuration, wherein:
    in said extended configuration said base and said shield are maximally separated; and in said compact configuration said base and said shield are positioned in a parallel-planar configuration with said base confronting said shield.

12. The light shield of claim 1, wherein said shield further comprises a reflective surface.

13. The light shield of claim 1, wherein each of said base and said shield have a planar area of between 40 square inches and 144 square inches.

14. The light shield of claim 1, wherein said shield is opaque.

* * * * *